United States Patent [19]

Buse

[11] 4,302,370
[45] Nov. 24, 1981

[54] ASBESTOS-FREE ASPHALT ROOF COATING

[75] Inventor: Mark W. Buse, Forth Worth, Tex.

[73] Assignee: Texas Refinery Corporation, Fort Worth, Tex.

[21] Appl. No.: 155,214

[22] Filed: Jun. 2, 1980

[51] Int. Cl.³ .............................................. C08L 91/00
[52] U.S. Cl. ........................ 260/28.5 AS; 106/273 R; 106/278
[58] Field of Search ............ 260/28.5 AS; 106/273 R, 106/278

[56] References Cited

U.S. PATENT DOCUMENTS

| | | | |
|---|---|---|---|
| 3,505,260 | 4/1970 | Woodruff | 260/28.5 AS |
| 3,634,293 | 1/1972 | Bonitz | 260/28.5 AS |
| 4,168,178 | 9/1979 | Hesseler | 106/278 |
| 4,168,179 | 9/1979 | Hesseler | 106/278 |

*Primary Examiner*—Melvyn I. Marquis
*Attorney, Agent, or Firm*—Charles D. Gunter, Jr.; James E. Bradley

[57] ABSTRACT

An asbestos-free asphalt composition is provided of the kind used in roofing applications. A polypropylene carbonate coupling agent is used with high density polyethylene fibers to prevent settling or separation of the components.

10 Claims, No Drawings

ASBESTOS-FREE ASPHALT ROOF COATING

BACKGROUND OF THE INVENTION

1. Field of the Invention

This invention relates generally to asbestos-free asphalt compositions of the type used in roof coatings and specifically to an asphalt composition utilizing finely divided polyolefin fibers and a coupling agent to hold the fibers in suspension.

2. Description of the Prior Art

Asphalt compositions comprising asphalt cutback, asbestos fiber, and particulate fillers such as limestone are well known in the roofing industry. These compositions are used in caulking and flashing, and as roofing cement and waterproofing agents in roofing applications. Increasingly stringent government standards regulating the use of asbestos have focused attention on the need for a replacement for the asbestos component in asphalt compositions. Although various materials can be used to thicken asphalt compositions, asbestos fibers provide the strength needed in many applications.

Blending synthetic fibers with asphalt is a concept which has been known for some time. For instance, U.S. Pat. No. 3,505,260 to Gene N. Woodruff, issued Apr. 7, 1970, entitled "Asphalt-Polyolefin Fiber Blends" discloses an asbestos-free asphalt composition containing polyolefin fibers in a water based system. U.S. Pat. No. 3,634,293 to Eckhard Bonitz, issued Jan. 11, 1972, entitled "Compositions Containing Bitumen and an Olefin Polymer", teaches the use of olefin polymers with a basic substance and sulfur in bituminous compositions. Replacing asbestos with polyolefin fibers has posed problems in the past, however, because the polyolefin fibers tended to separate or settle out during storage. This problem is especially troublesome in roofing applications in which the coating is often applied with a spray gun.

Recent efforts toward asbestos-free asphalt compositions have tended to be "fiber-free" in order to avoid the problem of separation of components. See e.g. U.S. Pat. No. 4,168,179 to William F. Hesseler, issued Sept. 18, 1979, entitled "Bituminous Composition" in which high structure carbon black is dispersed in asphalt cutback. However, as has been mentioned, fibers provide added strength. Fibers provide improved bond strength between the asphalt and the underlying surface as well as improved film strength in the asphalt layer itself. For these reasons, fiber containing asphalt compositions show as much as 30 percent increase in tensile strength over asphalt compositions which are fiber-free. Also certain of the fiber-free formulations are prohibitively expensive as compared to asbestos containing compositions.

SUMMARY OF THE INVENTION

It is therefore an object of the present invention to provide an asbestos-free asphalt composition in which no separation of the components occurs.

It is also an object of the present invention to provide an asbestos-free asphalt composition which contains fibers for added strength.

Another object of the present invention is to provide an asbestos-free asphalt composition which is competitively priced.

Accordingly, the asbestos-free asphalt composition of the present invention comprises asphalt cutback, finely divided polyolefin fibers, and propylene carbonate coupling agent. A preferred composition includes:

asphalt cutback, wherein said cutback comprises approximately 70 weight percent asphalt and 30 weight percent solvent for said asphalt;

approximately 3.5 weight percent calcium carbonate filler based on the total composition;

approximately 2 weight percent finely divided fibers of high density polyethylene based on the total composition; and approximately 2 weight percent propylene carbonate coupling agent based on the total composition.

A method for producing an asbestos-free asphalt composition is disclosed which comprises the steps of:

simultaneously adding approximately 92.5 weight percent asphalt cutback and 2 weight percent propylene carbonate coupling agent based on the total composition to a mixing vessel;

slowly mixing the contents of the vessel until they are thoroughly blended;

adding approximately 2 weight percent high density polyethylene fibers based on the total composition and mixing thoroughly; and adding approximately 3.5 weight percent calcium carbonate filler based on the total composition and mixing thoroughly.

DETAILED DESCRIPTION OF THE INVENTION

The asbestos-free asphalt compositions of the present invention include asphalt cutback, finely divided polyolefin fibers, and propylene carbonate coupling agent. The asphalt cutback used in the practice of the invention comprises asphalt and a suitable solvent which, when combined with the asphalt in the proper proportions, gives a pumpable liquid. Asphalt suitable for use in compositions of the present invention can be any of the asphalts normally found suitable for roofing purposes including natural asphalt, and asphalt obtained as a residue in petroleum or coal tar refining which has been air and/or steam blown. Asphalt tested according to the procedure outlined in The American Society of Testing Materials Standard (ASTM) D-5-73 and characterized by penetrations at 77° F. (Fahrenheit) between about 5 and about 100 dmm (tenths of a millimeter) and having a ring and ball softening point between about 80° F. and about 240° F. are suitable. The preferred material is a catalytically blown asphalt having a penetration at 77° F. between about 60 to 75 dmm, and a ring and ball softening point between about 135° to 150° F.

The solvent used in preparation of the asphalt cutback is conveniently any of the solvents normally used for asphalt cutbacks with naphtha 300°–360° being preferred. Other suitable solvents include Stoddard solvent, mineral spirits, and the like. The asphalt cutback of the present invention comprises between about 30 to 80 weight percent asphalt and between about 20 to 70 weight percent solvent for said asphalt. While the amount of solvent in the asphalt cutback can be broadly within the range given above, it will be understood that the amount of solvent used in a particular composition will depend, at least in part, upon the particular solvent and asphalt used as well as the temperature at which the composition of the invention is to be used. If desired, a portion of the solvent content of the asphalt cutback can be added during blending of the composition of the invention rather than during manufacture of the asphalt cutback.

Polyolefin fibers, particularly finely divided fibers of mono-1-olefins having from 2 to 4 carbon atoms per molecule, preferably polymers of ethylene or propylene including homopolymers and copolymers, are used in the inventive composition. The preferred material is a high density polyethylene fiber sold under the trademark FYBREL by Crown Zellerbach Company, said material having a melting range from 130° to 135° C. (Centrigrade), an average fiber length of 0.7 mm (millimeters) and an average fiber diameter of approximately 0.035 mm. The polyolefin fibers are present in the asbestos-free asphalt composition in a range from about 0.5 to 5.0 weight percent, preferably about 1.0 to 3.0 weight percent with the preferred amount being about 2.0 weight percent based on the total composition. Increasing the amount of polyolefin fibers present increases the viscosity of the composition. Above about 5.0 weight percent polyolefin fibers, the composition becomes too thick to spray.

The preferred coupling agent is propylene carbonate (4 methyldioxylene-2). Propylene carbonate is present in a range from about 0.5 to 6.0 weight percent, preferably about 0.5 to 2.5 weight percent, with the preferred amount being 2.0 weight percent based on the total composition. At lower storage temperatures, about 0.5 weight percent propylene carbonate is sufficient to prevent separation of the components. Where storage temperatures are expected to range between 100°–150° F., as where drums of roof coating are stored in direct sunlight, about 2 weight percent propylene carbonate is preferred. Amounts above about 6.0 weight percent are unnecessary to prevent separation of the components and are limited primarily by economic considerations.

The asbestos-free asphalt compositions of the present invention can optionally contain a particulate filler. Suitable filler materials include particulate fillers of the type generally considered suitable for asphalt compositions including, for example, calcium carbonate, bentone clay, perlite, glass microspheres, sandstone, dust, slate powder, rubber, alumina, etc. The preferred particulate filler is calcium carbonate which thickens the composition while also acting as a UV inhibitor. The particulate filler is present in a range from about 0 to 30 weight percent, preferably about 2 to 12 weight percent, with the preferred amount being about 3.5 weight percent based on the total composition or it may be omitted entirely.

The invention is best described with reference to the following example wherein an asbestos-free asphalt roof coating was prepared by simultaneously adding approximately 92.5 weight percent asphalt cutback and 2.0 weight percent propylene carbonate to a mixing vessel. The asphalt cutback is approximately 70% by weight asphalt and 30% by weight naphtha solvent. The contents of the vessel are then mixed slowly until thoroughly blended. Approximately 2.0 weight percent high density polyethylene fibers are then added and mixed thoroughly. Approximately 3.5 weight percent calcium carbonate is added to the composition in the final step and mixed thoroughly. It is critical that the above method be carried out in the sequence specified. The propylene carbonate must be thoroughly blended with the asphalt cutback prior to adding the polyethylene fibers or separation of the components will occur.

EXAMPLE I

| Component | Weight % based on the total composition |
| --- | --- |
| asphalt cutback | 92.5 |
| Ca CO₃ | 3.5 |
| polyethylene fibers | 2.0 |
| propylene carbonate | 2.0 |

The following physical properties of the composition were noted:

| | | | |
| --- | --- | --- | --- |
| penetration | 253 dmm | cure time | 24 hrs. |
| total solids | 67.8% | temp. at which sagging occurs | 300° F. |
| ash | 1.72% | separation | None |
| wt/gal | 7.6 lbs. | | |
| flash point | 111° F. | | |

Penetration tests were performed using a similar procedure that outlined in ASTM D-5-73. The procedure was modified to account for the fact that the asphalt compositions of the invention are liquid at room temperature. In the standard procedure for testing base asphalts which are solid at room temperature, a needle with a gauge attached falls onto a layer of asphalt contained in a small pan. The gauge is read after five seconds and indicates the penetration of the needle in tenths of a millimeter (dmm).

In the modified procedure, the specimen is contained in a sample tube 2½ inches long and ⅜ inch internal diameter. A plunger ¼ inch in outside diameter and 2 inches long is screwed to the shaft of a grease penetrometer. The combined weight of the shaft and plunger is 25 grams. The sample tube is mounted on the grease penetrometer in the line of travel of the plunger. The sample is tested at 77° F. The plunger is allowed to fall into the sample tube. The distance the plunger falls into the sample in five seconds is read off the penetrometer gauge. Readings are in dmm. Preferred readings for roof coatings are between about 198 and 314 dmm.

The composition was tested for separation or settling by placing a specimen in a centrifuge and spinning the same for approximately 10 minutes at 3500 rpm. The specimen was then visably examined to see if separation or settling of the components had occurred. A properly blended composition has a rough texture and dull appearance. When separation occurs, the asphalt cutback forms a smooth shiny film on the top of the specimen.

EXAMPLE II

A composition was prepared using the method described in Example I.

| Component | Weight % based on the total composition |
| --- | --- |
| asphalt cutback | 82.4 |
| Ca CO₃ | 11.5 |
| polyethylene fibers | 4.5 |
| propylene carbonate | 1.6 |

The following physical properties were observed:

| | | | |
| --- | --- | --- | --- |
| penetration | 202 dmm | flash point | 113° F. |
| total solids | 76.78% | cure time | 24 hrs. |
| ash | 9.56% | temp. at which | |

| | | sagging occurs | 300° F. |
|---|---|---|---|
| wt/gal | 8.2 | separation | None |

EXAMPLE III

A composition was prepared using the method described in Example I. Additional solvent in the form of mineral spirits was added in the first step and bentone clay filler was added in the final step.

| Component | Weight % based on the total composition |
|---|---|
| asphalt cutback | 78 |
| Ca CO$_3$ | 10 |
| mineral spirits | 7.5 |
| propylene carbonate | 1.5 |
| polyethylene fiber | 2.0 |
| bentone clay | 1.0 |

The following physical properties were observed:

| penetration | 233 dmm | flash point | 104° F. |
|---|---|---|---|
| total solids | 68.0 | cure time | 24 hrs. |
| ash | 7.81 | temp. at which sagging occurs | 340° F. |
| wt/gal | 8.03 | separation | None |

It should be apparent from the foregoing that an improved asbestos-free asphalt compositions have been provided in which no separation of the components occurs. Although asbestos-free, the compositions contain polyolefin fibers for added strength. The polyethylene fibers of the present invention cost approximately four times as much as the prior art asbestos fiber. However, prior art asbestos containing compositions contained approximately 8–10 weight percent asbestos. Because of the increased surface area of the high density polyethylene fibers, approximately 2 weight percent is sufficient. The improved asbestos-free asphalt composition which has been provided can, therefore be produced at a price which is competitive with prior art asbestos containing compositions.

While the invention has been shown in only three of its forms, it should be apparent to those skilled in the art that it is not thus limited but is susceptible to various changes and modifications without departing from the spirit thereof.

I claim:

1. An asbestos-free composition, comprising:
   asphalt cutback;
   finely divided polyolefin fibers blended with said asphalt cutback to form a suspension of polyolefin fibers in said asphalt cutback;
   propylene carbonate coupling agent, said propylene carbonate being present in an effective amount to maintain said polyolefin fibers in suspension in said asphalt cutback so that substantially no settling-out of the polyolefin fibers occurs.

2. An asbestos-free asphalt composition, comprising:
   asphalt cutback;
   finely divided fibers of a mono-1-olefin polymers having from 2 to 4 carbon atoms per molecule in a range from about 0.5 to 5.0 weight percent based on the total composition; and
   propylene carbonate coupling agent in a range from about 0.5 to 6.0 weight percent based on the total composition.

3. An asbestos-free asphalt composition, comprising:
   asphalt cutback;
   finely divided fibers of a polymer selected from the group consisting of homopolymers or copolymers of ethylene or propylene in a range from about 0.5 to 5.0 weight percent based on the total composition;
   propylene carbonate coupling agent in a range from about 0.5 to 6.0 weight percent based on the total composition.

4. The asbestos-free asphalt composition of claim 3, wherein said asphalt cutback comprises between about 30 to 80 weight percent asphalt and between about 20 to 70 weight percent solvent for said asphalt.

5. The asbestos-free asphalt composition of claim 4, wherein said finely divided fibers are high density polyethylene.

6. The asbestos-free asphalt composition of claim 5, wherein the composition further comprises between about 2 to 30 weight percent particulate filler based on the total composition.

7. The asbestos-free asphalt composition of claim 6, wherein said particulate filler is calcium carbonate.

8. An asbestos-free asphalt composition, comprising:
   asphalt cutback, wherein said asphalt cutback comprises approximately 70 weight percent asphalt and 30 weight percent solvent for said asphalt;
   approximately 3.5 weight percent calcium carbonate filler based on the total composition;
   approximately 2.0 weight percent finely divided fibers of high density polyethylene based on the total composition; and
   approximately 2.0 weight percent propylene carbonate coupling agent based on the total composition.

9. A method for producing an asbestos-free asphalt composition comprising the steps of:
   simultaneously adding asphalt cutback and propylene carbonate coupling agent to a mixing vessel, said propylene carbonate being present a range between about 0.5 and 6.0 weight percent based on the total composition;
   slowly mixing the contents of the vessel until they are thoroughly blended;
   adding finely divided fibers of a polymer selected from the group consisting of homopolymers or copolymers of ethylene or propylene, said finely divided fibers being present in a range between about 0.5 to 5.0 weight percent based on the total composition, and mixing thoroughly; and
   adding a particulate filler, said filler being present in a range between about 2 to 30 weight percent based on the total composition, and mixing thoroughly.

10. A method for producing an asbestos-free asphalt composition comprising the steps of:
    simultaneously adding approximately 92.5 weight percent asphalt cutback and 2.0 weight percent propylene carbonate coupling agent based on the total composition to a mixing vessel;
    slowly mixing the contents of the vessel until they are thoroughly blended;
    adding approximately 2.0 weight percent high density polyethylene fibers based on the total composition and mixing thoroughly; and
    adding approximately 3.5 weight percent calcium carbonate filler based on the total composition and mixing thoroughly.

* * * * *